United States Patent [19]

Lucchesi et al.

[11] 3,917,974
[45] Nov. 4, 1975

[54] SCINTILLATION CAMERA BRIGHTNESS CALIBRATING APPARATUS

[75] Inventors: Oreste J. Lucchesi, Bloomingdale; Donald A. Whiteman, Crystal Lake, both of Ill.

[73] Assignee: G. D. Searle & Co., Chicago, Ill.

[22] Filed: Nov. 23, 1973

[21] Appl. No.: 418,229

[52] U.S. Cl. .................. 315/30; 250/20 S; 315/379
[51] Int. Cl.² ........................................ H01J 29/70
[58] Field of Search ....... 315/30, 31, 27 R, 18, 388, 315/379; 250/369, 20 S

[56] References Cited
UNITED STATES PATENTS

| | | | |
|---|---|---|---|
| 3,449,619 | 6/1969 | Stald | 315/30 |
| 3,532,927 | 10/1970 | Hindel | 315/30 |
| 3,558,892 | 1/1971 | Seeley | 250/20 S |
| 3,582,661 | 6/1971 | Emmasingel | 250/20 S |
| 3,732,420 | 6/1971 | Brunnett et al. | 250/369 |

*Primary Examiner*—Maynard R. Wilbur
*Assistant Examiner*—J. M. Potenza
*Attorney, Agent, or Firm*—Neuman, Williams, Anderson & Olson

[57] ABSTRACT

Circuitry is disclosed for calibrating the brightness level of the cathode ray tube associated with a scintillation camera. The apparatus disclosed includes circuitry for generating a raster over a small area of the cathode ray tube face. A photodiode is mounted closely adjacent that face area and produces an output voltage related to the brightness of the emitted light. That voltage is amplified and applied to a comparator circuit which compares the amplitude thereof with that of a reference voltage. The cathode ray tube beam intensity is altered until the comparator output achieves a desired state. The raster is chopped to produce a series of dots on the cathode ray tube face and minimize problems of aging of the tube phosphor. In one embodiment, the output of the photodiode is processed to minimize the effects of light and electrical noise.

19 Claims, 3 Drawing Figures

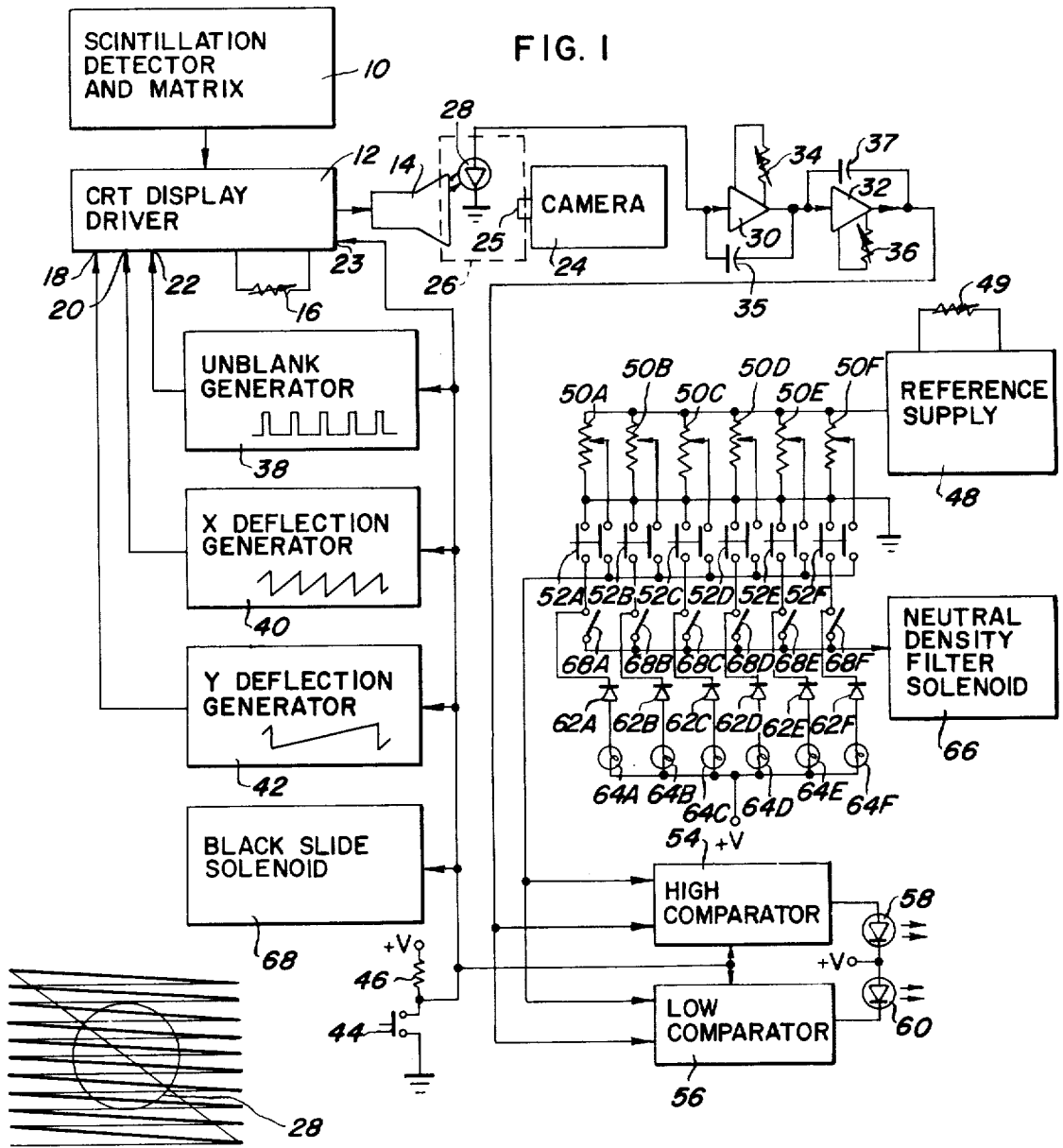
FIG. 1
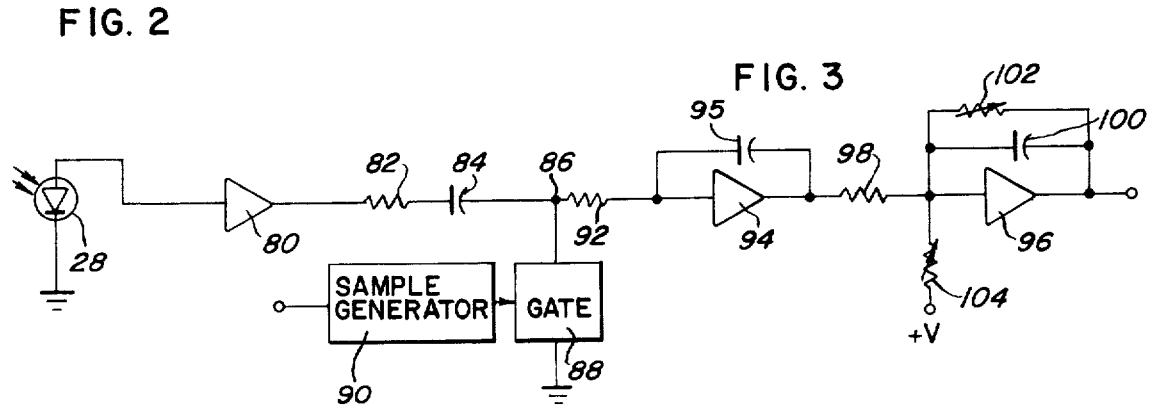
FIG. 2
FIG. 3

SCINTILLATION CAMERA BRIGHTNESS CALIBRATING APPARATUS

BACKGROUND OF THE INVENTION

This invention relates to apparatus for calibrating the brightness of a cathode ray tube display apparatus and, in particular, relates to apparatus for calibrating the brightness of the cathode ray tube in a scintillation camera to achieve both consistent and optimum film exposures.

Scintillation cameras have achieved wide use particularly in the medical diagnostic field. They are commonly used by placing into a patient small amounts of a radioactive substance. A scintillation detector is placed in the area of the anatomical structure to be observed and the pattern of distribution of the emissions from the radioactive material is observed on the face of a cathode ray tube and recorded by photographing the cathode ray tube face. One form of scintillation camera is more fully discussed in copending U.S. patent application Ser. No. 312,231, filed on Dec. 4, 1972 now U.S. Pat. No. 3,852,602 and entitled Scintillation Camera with Rapid Sequence Imaging Device.

As is well known, different radioactive substances are used for scintillation studies of different anatomical structures, which different substances have different radiation characteristics and, in particular, different radiation emission rates. Additionally, different anatomical structures result in different emission densities. In the use of scintillation cameras, it is desired to obtain optimum exposures despite variations in the radiation emission rate and emission density. Further, scintillation detector and display systems are subject to variations in the light output at the cathode ray tube face due to such effects as, among others, system drift and component aging, and, particularly, aging of the cathode ray tube itself. Different scintillation detector and display systems are likely to give different values of light output at the cathode ray tube face due to differences in component values and characteristics and differences in calibration between units. However, in performing scintillation studies it is desirable that the photographic or other output of the detector and display system be consistent at different times so that the results of studies made at different times may be directly compared. Moreover, it is desirable that the outputs produced by different detector and display systems be consistent with one another so that studies made on different systems may be directly compared.

The art has not previously produced a means for calibrating the brightness of scintillation cameras sufficiently accurate to meet the needs of present day diagnostic techniques. In particular, the calibration techniques of the past have required the camera operator to exercise a high degree of personal judgment in effectuating calibration, thus resulting in variations in the absolute level of calibration and the accuracy of calibration between different operators and between different performances of the calibration technique by the same operator. Further, the calibration techniques of the prior art did not permit convenient alteration of the calibration level to compensate for differences in the rate or density of the scintillations, the film being used, or other variables.

SUMMARY OF THE INVENTION

There is provided by this invention apparatus for calibrating the brightness of the light emitted by a cathode ray tube and, in particular, the brightness of the light generated by a cathode ray tube used for displaying a scintillation pattern as part of a scintillation camera. The apparatus includes a light sensitive circuit means for generating a signal representative of the brightness of the emitted light, a circuit for generating a reference signal, and a comparator for comparing the reference signal with that generated by the light sensitive circuit means. Circuitry may be included for minimizing the effect of electrical or light noise. Further, circuitry may be provided for altering the calibration level in accord with different desired exposure levels.

Thus, it is an object of this invention to provide apparatus for calibrating the brightness of the light emitted by a cathode ray tube.

It is an object of this invention to provide apparatus for calibrating the light output of a scintillation display apparatus.

It is an object of this invention to provide apparatus for calibrating a scintillation camera.

It is an object of this invention to provide apparatus for calibrating a scintillation camera which is characterized by a high degree of accuracy and consistency in results.

It is an object of this invention to provide apparatus for calibrating a scintillation camera wherein the calibration level may be easily and conveniently altered.

It is an object of this invention to provide apparatus for calibrating a scintillation camera wherein the effects of light and electrical noise are minimized.

It is an object of this invention to provide apparatus for use with scintillation cameras to improve the consistency of the photographs produced thereby.

It is an object of this invention to provide apparatus for use with scintillation cameras to insure that optimum exposures are obtained despite variations in scintillation rate or density, the characteristics of the film being used, or other system variables.

It is an object of this invention to provide apparatus for calibrating scintillation cameras which are characterized by simplicity of design, economy of construction, and ease and reliability in operation.

Other objects of this invention will appear from this specification with appended claims and the drawing.

DESCRIPTION OF THE DRAWING

FIG. 1 shows in block form a scintillation camera including a calibrating apparatus in accord with one embodiment of this invention;

FIG. 2 is a representation of the raster produced by a portion of the calibrating apparatus of FIG. 1; and FIG. 3 shows a modification which may be made to the calibrating apparatus of FIG. 1 in accord with another embodiment of this invention.

DESCRIPTION OF THE PREFERRED EMBODIMENTS

This invention will now be disclosed with reference to particular apparatus for calibrating scintillation cameras. However, it will be apparent to those skilled in the art that the invention is capable of much broader application than those specifically here shown.

There is disclosed in block form in FIG. 1 a scintillation camera including a scintillation detector and matrix 10. It receives scintillations from the subject under study and supplies information concerning the location thereof to cathode ray tube display driver 12. The driver 12 is coupled to a cathode ray tube 14. The driver 12 supplies to the cathode ray tube the signals required to generate and control the intensity and position of the cathode ray beam within tube 14. The driver 12 includes as a part thereof a manually operable variable resistance 16 for adjusting the intensity of the electron beam generated in cathode ray tube 14 and incident on the face thereof. An input 18 to the driver 12 is operative to control the Y deflection, i.e., the vertical position, of the beam in cathode ray tube 14 while an input 20 is operative to control the X deflection, i.e., the horizontal position, of that beam. The driver 12 also includes an input 22 which, when a proper signal is applied thereto, is effective to extinguish the beam in the cathode ray tube, thus blanking the face thereof. An input 23 to driver 12 is such that when a positive voltage signal is applied thereto, the cathode ray tube beam is under the control of the signals present at inputs 18, 20, and 22. Otherwise, the beam is controlled by the information from the detector and matrix 10. A camera 24 with a lens 25 is suitably disposed to photograph the face of cathode ray tube 14. The face of cathode ray tube 14 and the lens of camera 24 are enclosed in a light-tight container, indicated at 26, so that no light may enter the camera lens other than that generated by the cathode ray tube. The construction and operation of elements 10, 12, 14, 24, 25, and 26 will be obvious to those skilled in the art and need not be further described here. See, for example, the aforementioned U.S. patent application Ser. No. 312,231.

The calibration circuit of this invention includes a photodiode 28 disposed closely adjacent the face of cathode ray tube 14 and located so as to receive the light emitted from a portion of the tube face. The diode is preferably located near an edge of the tube face so that it is outside the portion of the tube face photographed by camera 24. The cathode of the diode is coupled to a point of reference potential, shown diagrammatically as a circuit ground, and the anode thereof is coupled to the input of an integrating amplifier 30. The output of amplifier 30 is coupled to the input of another integrating amplifier 32. Amplifier 30 includes a variable resistance 34 for adjusting its d.c. offset and amplifier 32 includes a variable resistance 36 for adjusting its gain. The amplifiers 30 and 32 are shown in diagrammatic form, but each may include one operational amplifier from the pair of operational amplifiers sold by Fairchild Semiconductor, Mountain View, Calif., under the model designation "$\mu$A741". Capacitors 35 and 37 coupled between the input and output of amplifiers 30 and 32, respectively, provide the desired integrating operation.

The calibrating circuit further includes an unblank generator 38. The unblank generator is comprised of a multivibrator and, when a positive voltage signal is applied to a control input thereof, produces at the output a series of relatively short duration pulses shown diagrammatically in FIG. 1. The unblank generator output is coupled to input 22 of driver 12 and is such that the cathode ray beam is present during the pulses but is otherwise extinguished. An X deflection generator 40 is included which comprises a sawtooth waveform generator. When a positive voltage signal is applied to a control input thereof, the generator 40 produces at its output a sawtooth waveform shown diagrammatically in FIG. 1. The X deflection generator output is coupled to input 20 of driver 12. There is also included a Y deflection generator which is similar to X deflection generator 42 in that it comprises a sawtooth waveform generator and is effective, when a positive voltage signal is applied to a control input thereof, to produce at its output a sawtooth waveform shown diagrammatically in FIG. 1. The frequency of the output of the Y deflection generator 42 is significantly less than that of X deflection generator 40. The Y deflection generator also has a relatively large d.c. component, not shown in FIG. 1. The waveform representations of FIG. 1 are not intended to represent the relative frequencies involved.

The X and Y deflection generators 40 and 42 combine to generate a raster over a small portion of the face of cathode ray tube 14 in the area of photodiode 28. Such a raster is shown in FIG. 2. The d.c. component in the output of Y deflection generator 24 insures that the raster is removed from the center of the cathode ray tube face and vertically displaced to the vicinity of the photodiode. The area covered by the raster is somewhat larger than the light sensitive area of the photodiode so that any effects such as drift which tend to slightly dislocate the position of the raster will not adversely effect the operation of the calibration circuit.

The unblank generator 38 alters the pattern displayed on the face of the cathode ray tube 14 from that shown in FIG. 2 to a pattern of dots, the dots appearing on the lines of the raster. The use of a dot pattern rather than a continuous raster reduces the rate of aging of the cathode ray tube phosphers in the area covered by the raster. It is possible to achieve many of the advantageous results of this invention without the use of the unblank generator and with the use of a continuous raster rather than a dot pattern. It has been found advantageous to construct unblank generator 38 so that the pulses generated thereby have a duration of approximately 1 microsecond and to make the frequencies of operation of unblank generator 38, X deflection generator 40, and Y deflection generator 42 to be on the order of 100 kHz, 10 kHz, and 1 kHz, respectively. This choice of frequencies minimizes the presence of undesirable beat signals which might otherwise occur.

A push-buttom switch 44 is provided for enabling the operation of the calibration circuit. It is normally open and has a first terminal coupled to ground and a second terminal coupled to a source of positive voltage through a resistor 46. The second terminal of switch 44 is coupled to the input 23 of display driver 12 and the control inputs of unblank generator 38, X deflection generator 40, and Y deflection generator 42 so that when switch 44 is depressed, the cathode ray tube beam is placed under the control of inputs 18, 20, and 22 of driver 12 and generators 38, 40, and 42 are made to operate in the previously described manner.

The calibrating circuit further includes a precision reference voltage supply 48 which generates at an output a very accurately controlled d.c. voltage. The supply 48 includes a variable resistance 49 to initially establish the level of the output voltage. The reference supply output is coupled to first terminals of the resistive elements of six potentiometers 50A–50F, the second terminals of which are each connected to a reference potential which is shown as ground. Potentiometer 50A has a dial associated therewith so that it may consistently be returned to the same position. The wiper arms of potentiometers 50A–50F are individually coupled to one terminal of a first section of double pole single throw switches 52A–52F. The second terminals of the first sections of switches 52A–52F are coupled to both a first input of a high voltage comparator 54 and a first input of a low voltage comparator 56. The output of d.c. amplifier 32 is coupled to both a second input of high voltage comparator 54 and a second input of low voltage comparator 56. The second terminal of switch 44 is coupled to control inputs of voltage comparators 54 and 56. The outputs of the high and low voltage comparators 54 and 56 are coupled through light emitting diodes 58 and 60, respectively, to a source of positive voltage indicated as +V. The light emitting diodes are oriented so that the cathode of diode 58 and the anode of diode 60 are coupled to the positive supply.

High voltage comparator 54 is such that when a positive voltage is applied to its control input, it compares the voltage applied to its second input terminal, the amplifier 32 output, with that applied to its first input terminal, a voltage derived from reference supply 48. When the voltage at the second input terminal exceeds that at the first by a predetermined offset amount, the voltage at the output of high comparator 54 exceeds that of the supply +V so that current flows through diode 58 causing it to emit light. Otherwise, no current flows through the diode 58. Low voltage comparator 56 is such that when a positive voltage is applied to its control input, it compares the voltage applied to its second input terminal with that applied to its first input terminal; when the voltage at the second input terminal is less than that at the first by a predetermined offset amount, the voltage at the output of comparator 56 is less than that of the supply +V so that current flows through diode 60 causing it to emit light. Otherwise, no current flows through the diode 60. It will thus be seen that high voltage comparator 54 and low voltage comparator 56 in combination form a voltage comparator which has as its output two light emitting diodes 58 and 60 which indicate by the emission of light whether the voltage at the second inputs of high and low comparators 54 and 56 is greater than or less than, respectively, the voltage at the first inputs by the offset amount. The offset amount creates a window extending on either side of the voltage at the first comparator inputs. If the voltage at the second inputs is within the window, neither of diodes 58 or 60 emit light.

When the switch 52A is closed, the remaining switches 52B–52F being open, the voltage applied to the first inputs of comparators 54 and 56 from reference supply 48 is determined by the adjustment of potentiometer 50A. The variable resistances 34, 36, and 49 must be accurately adjusted to obtain the desired operation of the calibration circuits. The setting of these elements is normally a factory calibration adjustment.

To operate the calibration circuit as thus far described, the operator first sets potentiometer 50A to a desired dial setting. The dial setting is a previously ascertained number which varies with such factors as the nature of the radioactive substance being used in the study to be performed, the exposure characteristics of the film being used, the length of time of the film exposure, etc. A set of charts or nomographs may conveniently be provided to give the correct dial setting for various combinations of factors. After setting potentiometer 50A, the operator closes switch 44, thus activating generators 38, 40, and 42 and comparators 54 and 56 and placing the cathode ray tube beam under the control of the generators. The operator must then merely adjust the cathode ray tube beam intensity control 16 until neither of diodes 58 and 60 are emitting light. The beam intensity is then completely calibrated.

The calibration circuit of FIG. 1 includes a number of other features to increase its usefulness. Separate potentiometers 50B–50F are provided and each may be set for a different commonly occurring combination of factors which result in a desired beam intensity. Then each time that particular combination of factors occurs, the corresponding switch 52B–52F may be closed and switch 52A opened so that the operator may calibrate the beam intensity without setting potentiometer 50A to a specific dial setting.

Switches 52A–52F each include a second set of terminals, a first terminal of each of the second sets being coupled to ground and a second terminal being individually coupled through the series combination of a corresponding diode 62A–62F and indicating lamp 64A–64F to a positive voltage supply. The indicator lamp 64A–64F which is lit indicates that the voltage produced by the corresponding potentiometer 50A–50F is applied to comparators 54 and 56.

A neutral density filter, not shown, is provided which may be physically disposed in front of the lens of camera 24 by the actuation of a solenoid 66. Six single pole single throw switches 68A–68F are provided, each having one terminal thereof individually coupled to the second terminal of the second pair of terminals of the corresponding switch 52A–52F and the other terminal coupled to a common terminal point which serves to either enable or disable the neutral density filter solenoid 66 dependent upon whether that terminal point is coupled to ground. The neutral density filter reduces the amount of light transmitted from the cathode ray tube face to the camera by a factor of approximately 10. The neutral density filter extends the range of film exposures over which the calibration circuit is useful by effectively increasing the amount of light incident on the photocell 28 when only a relatively low light level is required to produce the desired exposures. Switches 52B–52F may conveniently be opened or closed at the same time potentiometers 50B–50F are set.

A black slide, not shown, is provided which may also be physically disposed in front of the lens of camera 24 by the actuation of a solenoid 68. The second terminal of switch 44 is coupled to a control terminal of black slide solenoid 68 such that when the switch is closed, the black slide is placed in front of the camera lens but otherwise the slide is removed from in front of the camera lens. The black slide prevents any light from the cathode ray tube face from entering camera 24 during the calibration process. Further, should the camera 24 be open during the calibration process as for the purpose of changing films, it prevents light coming through the camera from falling on photodiode 28.

The calibration circuit of FIG. 1 is used with a scintillation camera wherein no light is incident on the photodiode except that generated by the cathode ray tube. In some uses of scintillation cameras, external light is incident on the cathode ray tube face; this external light may be reflected onto the photodiode 28 adversely effecting the operation of the calibration circuit. There is disclosed in FIG. 3 a modification to the calibrating circuit of FIG. 1 which minimizes the effect of external light noise on the calibration circuit.

The photodiode 28 of the FIG. 3 embodiment is coupled between ground and the input of an amplifier 80. Amplifier 80 has a wide frequency response and a high input impedance; it may comprise an operational amplifier with a field effect transistor input stage. Its output is coupled through the series combination of a resistor 82 and a capacitor 84 to a circuit point 86. A gate element 88 is coupled between circuit point 86 and a reference potential shown as ground. A sample generator 90 has an input coupled to the output of the unblank generator 38 of FIG. 1 and its output coupled to a control input of gate 88. Sample generator 90 may comprise a monostable multivibrator which is triggered by the unblanking pulses from generator 38 and produces at its output a series of pulses which commence simultaneously with the unblanking pulses but extend for a period significantly longer than the unblanking pulses, which period is determined by the persistence time of the phosphors used in cathode ray tube 14. For example, the pulses from sample generator 90 may have a duration of approximately 9 microseconds. Gate 88 is such that circuit point 86 is held at ground potential except during the presence of pulses from sample generator 90. During the sample generator pulses, the signal from the output of amplifier 80 is applied from circuit point 86 through a resistor to the input of an integrating amplifier 94. The integrating amplifier may comprise an operational amplifier with a capacitor 95 coupled between the amplifier input and output terminals. The output of integrating amplifier is coupled to the input of another integrating amplifier 96 through a resistor 98. Integrating amplifier 96 may also comprise an operational amplifier with a capacitor 100 coupled between the amplifier input and output terminals. A variable resistor 102 is coupled in parallel with capacitor 100 and provides means for adjusting the gain of amplifier 96, and, thus, the overall gain of the series of amplifiers 80, 94, and 96. A variable resistor 104 is coupled from the input of amplifier 96 to a source of positive potential and provides means for adjusting the d.c. offset voltage present at the output of amplifier 96. Variable resistances 102 and 104, like variable resistances 34 and 36 of the FIG. 1 embodiment, are factory calibration adjustments. The output of amplifier 96 is coupled to the second inputs of high and low voltage comparators 54 and 56 in the FIG. 1 apparatus in place of the output of amplifier 32.

The signal present at the output of amplifier 80 is a series of pulses resulting from the repetitive dots on the face of the cathode ray tube. It is a.c. coupled to amplifier 94 through capacitor 84. The a.c. coupling minimizes any d.c. component in the output of amplifier 80 such as that which would result from a constant level of external light being incident on photodiode 28. Gate 88 maintains the d.c. voltage at circuit point 86 at ground potential between the pulses in the amplifier 80 output. It also removes any noise in the output of amplifier 80 occurring between the light pulses. The noise might result from extraneous light falling on photodiode 28 or external sources of electrical noise. Integrating amplifiers 94 and 96 and gate 88 form a gated rectifier effective to produce at the output of amplifier 96 a d.c. signal proportional to the amplitude of the a.c. signal present at circuit point 86. Any random noise present in the output of amplifier 80 is effectively averaged out by the integration process. The d.c. signal at the output of amplifier 96 is applied to high and low comparators 54 and 56 and used in the manner previously described.

It will thus be seen that calibration apparatus have been provided which fulfill each of the above-mentioned objects. It will be obvious that many modifications of the embodiments shown may be made without departing from the spirit and scope of this invention. For example, the outputs of the voltage comparator might be electrically coupled to apparatus for controlling the cathode ray tube beam intensity thus permitting the calibration to be performed entirely electrically without any manual operations.

While several particular embodiments of this invention are disclosed above, it will be understood, of course, that the invention is not to be limited thereto, since many modifications may be made, and it is contemplated, therefore, by the appended claims, to cover any such modifications as fall within the true spirit and scope of this invention.

We claim:

1. Circuitry for calibrating the brightness of a cathode ray tube display and recording apparatus comprising:

intensity control means for adjusting the intensity of the cathode ray tube beam;

light sensitive means disposed to receive light emitted from said cathode ray tube and generating a first electrical signal having a magnitude dependent upon the intensity of said emitted light;

reference signal generating means for generating a second electrical signal of predetermined magnitude; and electrical signal comparison means coupled to said light sensitive means and said reference signal generating means for comparing the magnitudes of said first and second electrical signals.

2. The calibrating circuitry of claim 1 further comprising raster generating means for generating a raster on the face of said cathode ray tube and said light sensitive means is disposed to receive light generated by said raster.

3. The calibrating circuitry of claim 2 further comprising unblanking means for chopping said raster and generating a pattern of dots on the face of said cathode ray tube.

4. Circuitry for calibrating the brightness of a cathode ray tube in a scintillation camera comprising:

raster generation means coupled to said cathode ray tube display for generating a raster over a portion of the face of said cathode ray tube;

a light sensitive electrical circuit element disposed adjacent said portion of said cathode ray tube face and arranged to receive light emitted from said raster;

circuit means coupled to said light sensitive electrical circuit element for generating a first electrical signal having a magnitude related to the brightness of the light emitted by said raster;

reference signal circuit means for generating a second electrical signal having a reference magnitude;

comparator means coupled to said circuit means and said reference signal circuit means for generating an output related to the relative magnitudes of said first and second electrical signals; and control means for altering the beam intensity of said cathode ray tube in response to said comparator means output.

5. The calibrating circuitry of claim 4 further comprising beam blanking means for alternately blanking and unblanking the cathode ray tube means and generating a pattern of dots on the face of said cathode ray tube.

6. Circuitry for calibrating the brightness of a cathode ray tube in a scintillation camera comprising:
   intensity control means for adjusting the intensity of the cathode ray tube beam;
   a light sensitive electrical circuit element disposed to receive light emitted from said cathode ray tube;
   circuit means coupled to said light sensitive electrical circuit element for generating a first electrical signal having a magnitude related to the brightness of the light emitted by said cathode ray tube;
   reference signal circuit means for generating a second electrical signal having a reference magnitude; and
   comparator means coupled to said circuit means and said reference signal circuit means for generating an output related to the relative magnitudes of said first and second electrical signals.

7. The calibrating circuitry of claim 6 further comprising blanking means for repetitively interrupting the transmission of light from said cathode ray tube to said light sensitive element.

8. The calibrating circuitry of claim 7 further comprising a.c. coupling means for coupling said light sensitive means to said circuit means and blocking the passage of d.c. signals from said light sensitive means to said circuit means.

9. The calibrating circuitry of claim 8 further comprising gating means coupled to said blanking means and said circuit means for maintaining the input to said circuit means at a reference potential between emissions of light from said cathode ray tube to said light sensitive element.

10. The calibrating circuitry of claim 7 wherein said circuit means further comprises integration means for integrating over time a signal developed from said light sensitive electrical circuit element.

11. The calibrating circuitry of claim 9 wherein said circuit means further comprises integration means for integrating over time a signal developed from said light sensitive electrical circuit element.

12. The circuitry of claim 1 further comprising means for selectively positioning light filtering means between said cathode ray tube display and said recording apparatus for reducing the amount of light transmitted from said cathode ray tube to said recording apparatus.

13. The circuitry of claim 1 further comprising means for selectively positioning light blocking means between said cathode ray tube display and said recording apparatus for preventing transmission of light between said cathode ray tube display and said recording apparatus during the operation of said circuitry.

14. The circuitry of claim 13 further comprising means for selectively positioning light filtering means between said cathode ray tube display and said recording apparatus for reducing the amount of light transmitted from said cathode ray tube display to said recording apparatus.

15. The circuitry of claim 4 further comprising means for selectively positioning light filtering means between said cathode ray tube display and said scintillation camera for reducing the amount of light transmitted from said cathode ray tube to said scintillation camera.

16. The circuitry of claim 4 further comprising means for selectively positioning light blocking means between said cathode ray tube display and said scintillation camera for preventing transmission of light between said cathode ray tube display and said scintillation camera during the operation of said circuitry.

17. The circuitry of claim 16 further comprising means for selectively positioning light filtering means between said cathode ray tube display and said scintillation camera for reducing the amount of light transmitted from said cathode ray tube display to said scintillation camera.

18. The calibrating circuitry of claim 6 wherein said comparator means further comprises:
   a first comparator circuit coupled to said circuit means and said reference signal circuit means for generating a first output signal when the magnitude of said first electrical signal exceeds the magnitude of said second electrical signal by a predetermined amount;
   a second comparator circuit coupled to said circuit means and said reference signal circuit means for generating a second output signal when the magnitude of said second electrical signal. exceeds the magnitude of said first electrical signal by a predetermined amount;
   first indicating means coupled to said first comparator circuit and indicating the presence of said first output signal; and
   second indicating means coupled to said second comparator circuit and indicating the presence of said second output signal.

19. The calibrating circuitry of claim 18 wherein said first and second indicating means are visual indicating means.

* * * * *

Disclaimer 3,917,974.—*Oreste J. Lucchesi, Bloomingdale* and *Donald A. Whiteman,* Crystal Lake, Ill. SCINTILLATION CAMERA BRIGHTNESS CALIBRATING APPARATUS. Patent dated Nov. 4, 1975. Disclaimer filed Oct. 4, 1976, by the assignee, *G. D. Searle & Co.*

Hereby enters this disclaimer to claims 1 and 6 of said patent.

[*Official Gazette December 7, 1976.*]